Jan. 5, 1943.  F. E. ANDERSON  2,307,657
LOGGING SWIVEL
Filed March 3, 1942
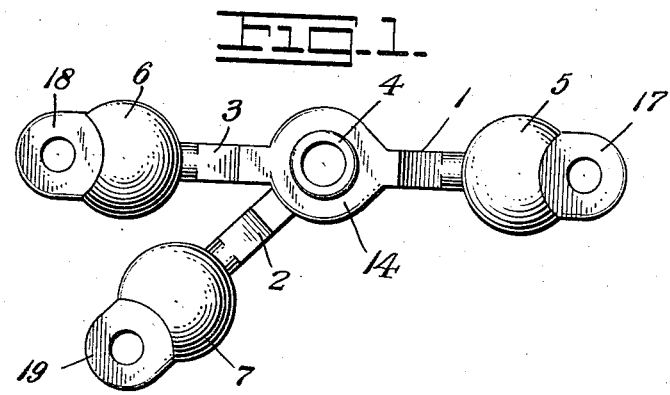
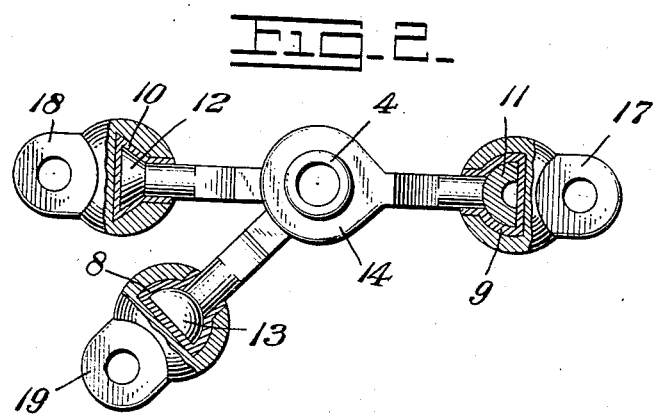
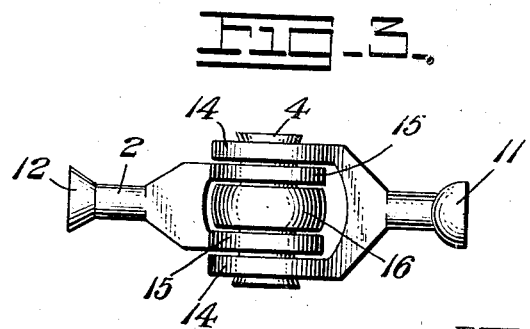
Inventor.
Fred E. Anderson Patented Jan. 5, 1943

2,307,657

UNITED STATES PATENT OFFICE 2,307,657

LOGGING SWIVEL

Fred E. Anderson, Taft, Oreg.

Application March 3, 1942, Serial No. 433,189
In Canada March 25, 1941

3 Claims. (Cl. 287—87)

My invention relates to improvements in swivels and the object of my improvement is to provide a swivel of freer action and more accessible construction than that shown in my Patent 2,176,519, dated October 17, 2939. Another object is to provide a friction reducing and yet tightly fitting joint. Still other objects will appear from the following description and claims.

In the drawing:

Figure I is a side view of the swivel.

Figure II is a side view partly in section.

Figure III is a top view with terminal sockets removed.

Shanks 1, 2, 3 are all provided with expanded terminal heads 11, 12, 13 at one end, and with integral rings 14, 15, 16 at the other. A tubular pin 4 passes through all the rings and is expanded at both ends to hold the rings in place.

Shanks 1 and 2 are bifurcated, each branch terminating in a ring. The ringed branches 14 of shank 1 embrace the ringed branches 15 of shank 2; shank 3 has a single ring 16 encircling the center of pin 4. The expanded heads of shanks 1, 2, 3 may be of hemispherical shape as shown at 11 and 13, or of modified, flattened form as shown at 12. The open construction of the central joint of the swivel permits easy access and repair and allows very free action of the swivel—especially of shank 3 to which the log cable is normally attached.

Embracing the terminal heads 11, 12, 13 are shells or sockets 5, 6, and 7, integrally provided with eyes 17, 18, 19 for the attachment of cables. The heads are loosely enough engaged by the sockets to permit the twisting of the drum cable attached to eyes 17, 18 or of the log cable attached to eye 19 without twisting together or entangling the cables. The three shank joint at pin 4 permits pull at any angle in the common plane, and the swiveling action at heads 11 and 12 permits any desired inclination of the plane.

The sockets 5, 6, 7 are very loosely fitted upon heads 11, 12, 13 to permit interposing therebetween a layer of low friction metal or alloy of different composition than that of the heads and shells. This layer may be of sheet metal die pressed about the heads or of zinc or alloy poured into the joint to fill the interspace. It will be evident that the tightly fitting sockets which embrace both the hemispherical heads and the necks of the shanks 1, 2, 3 permit of only twisting action between them and of no lateral rotation; and that the central joint upon pin 4 permits lateral action but no twisting.

I claim:

1. A swivel comprising a central tubular pin with flared ends, a shank with one end centrally pivoted upon said pin, a second shank bifurcated at one end with the branches embracing said first shank and likewise pivoted upon said pin, a third shank also bifurcated at one end with its branches embracing the branches of said second shank and likewise pivoted upon said pin; heads upon the opposite ends of all of said shanks, socket members embracing each of said heads, and projecting eyes integral with each of said socket members and projecting therefrom.

2. A swivel comprising a pin, shanks each pivoted at one end upon said pin, hemispherical heads at the opposite ends of said shanks integral therewith, sockets loosely engaging said heads, eyes integral with said sockets and projecting therefrom, and layers of soft metal interposed between said heads and said sockets to reduce friction.

3. A swivel comprising a pin, a shank pivoted at one end upon said pin, bifurcated shanks also pivoted at one end upon said pin, heads at the opposite ends of all of said shanks, sockets rotatively embracing each of said heads and the necks of said shanks, and eyes integral with said sockets and projecting therefrom.

FRED E. ANDERSON.